United States Patent
Ueda et al.

(10) Patent No.: US 9,719,430 B2
(45) Date of Patent: Aug. 1, 2017

(54) CONTROL SYSTEM FOR INTERNAL COMBUSTION ENGINE

(71) Applicant: DENSO CORPORATION, Kariya, Aichi-pref. (JP)

(72) Inventors: Kazuaki Ueda, Okazaki (JP); Tomoaki Nakano, Toyota (JP); Shigeru Maeda, Obu (JP); Masataka Nishikori, Nishio (JP); Shuhei Oe, Nukata-gun (JP); Hikaru Kokumai, Nishio (JP)

(73) Assignee: DENSO CORPORATION, Kariya (JP)

( * ) Notice: Subject to any disclaimer, the term of this patent is extended or adjusted under 35 U.S.C. 154(b) by 133 days.

(21) Appl. No.: 14/711,304

(22) Filed: May 13, 2015

(65) Prior Publication Data

US 2015/0330313 A1 Nov. 19, 2015

(30) Foreign Application Priority Data

May 13, 2014 (JP) .................................. 2014-099794
May 7, 2015 (JP) .................................. 2015-095141

(51) Int. Cl.
| | |
|---|---|
| F01L 1/34 | (2006.01) |
| F02D 13/02 | (2006.01) |
| F02D 41/12 | (2006.01) |
| F02D 41/00 | (2006.01) |
| F02D 41/22 | (2006.01) |

(52) U.S. Cl.
CPC ..... *F02D 13/0219* (2013.01); *F02D 13/0215* (2013.01); *F02D 13/0269* (2013.01); *F02D 41/0005* (2013.01); *F02D 41/123* (2013.01); *F01L 1/34* (2013.01); *F02D 41/22* (2013.01); *F02D 2013/0292* (2013.01); *F02D 2041/001* (2013.01); *Y02T 10/142* (2013.01); *Y02T 10/42* (2013.01)

(58) Field of Classification Search
CPC .... F01L 1/34; F02D 13/0215; F02D 13/0219; F02D 41/123; F02D 41/0005
USPC .......................................... 123/90.15, 90.17
See application file for complete search history.

(56) References Cited

U.S. PATENT DOCUMENTS

| | | | |
|---|---|---|---|
| 6,138,784 A | 10/2000 | Oshima et al. | |
| 6,389,807 B1 | 5/2002 | Suzuki et al. | |
| 7,793,625 B2 * | 9/2010 | Nakamura | ............ F01L 1/3442 123/90.15 |

(Continued)

FOREIGN PATENT DOCUMENTS

| | | |
|---|---|---|
| JP | S63-284030 A | 11/1988 |
| JP | H08-100689 A | 4/1996 |
| JP | H11-93723 A | 4/1999 |

(Continued)

*Primary Examiner* — Ching Chang
(74) *Attorney, Agent, or Firm* — Oliff PLC

(57) ABSTRACT

A control system for an internal combustion engine has an intake valve, an exhaust valve, and an exhaust purifying catalyst that purifies exhaust gas after combustion of a fuel. During a fuel cut in which no fuel is supplied, a closing timing of the intake valve is controlled to a delayed angle side more than at a timing when the fuel is supplied and to a delayed angle side more than at a timing at a bottom dead center of an intake stroke, and an opening timing of the exhaust valve is controlled to an advanced angle side more than at the timing when the fuel is supplied and to an advanced angle side more than at the timing at the bottom dead center of an expansion stroke.

13 Claims, 9 Drawing Sheets

(56) References Cited

U.S. PATENT DOCUMENTS

2010/0269772 A1   10/2010   Takemura et al.

FOREIGN PATENT DOCUMENTS

| JP | 2001-164970 A | 6/2001 |
| JP | 2010-255499 A | 11/2010 |
| JP | 2010-270705 A | 12/2010 |
| JP | 2012-067631 A | 4/2012 |

* cited by examiner

FIG.9A
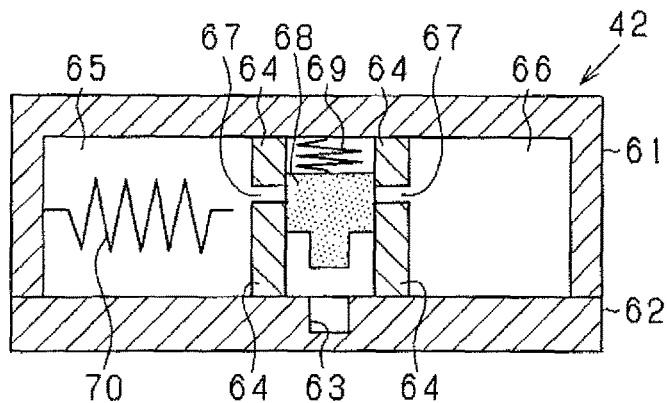
FIG.9B
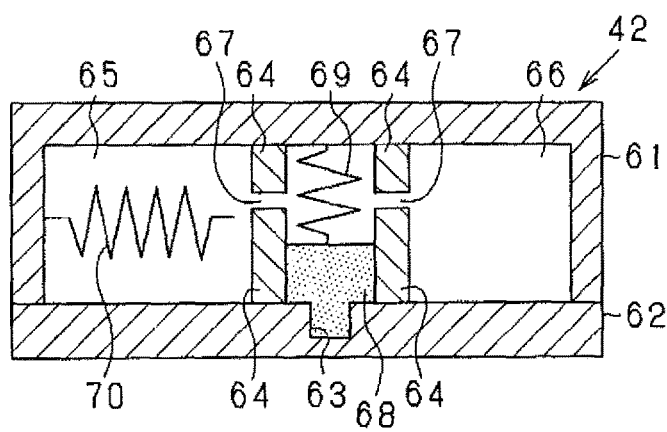
FIG.10
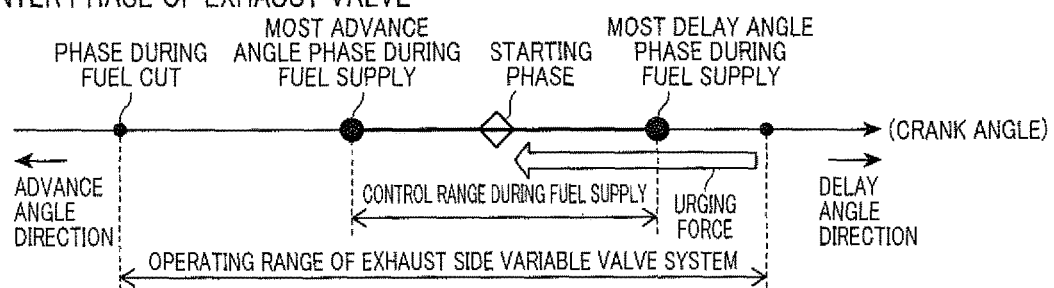
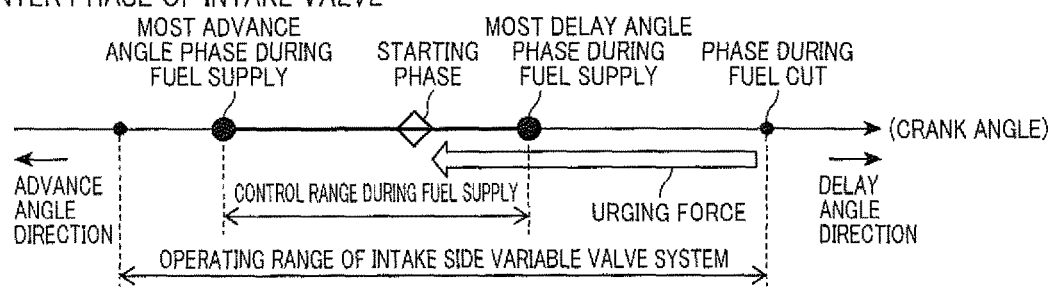

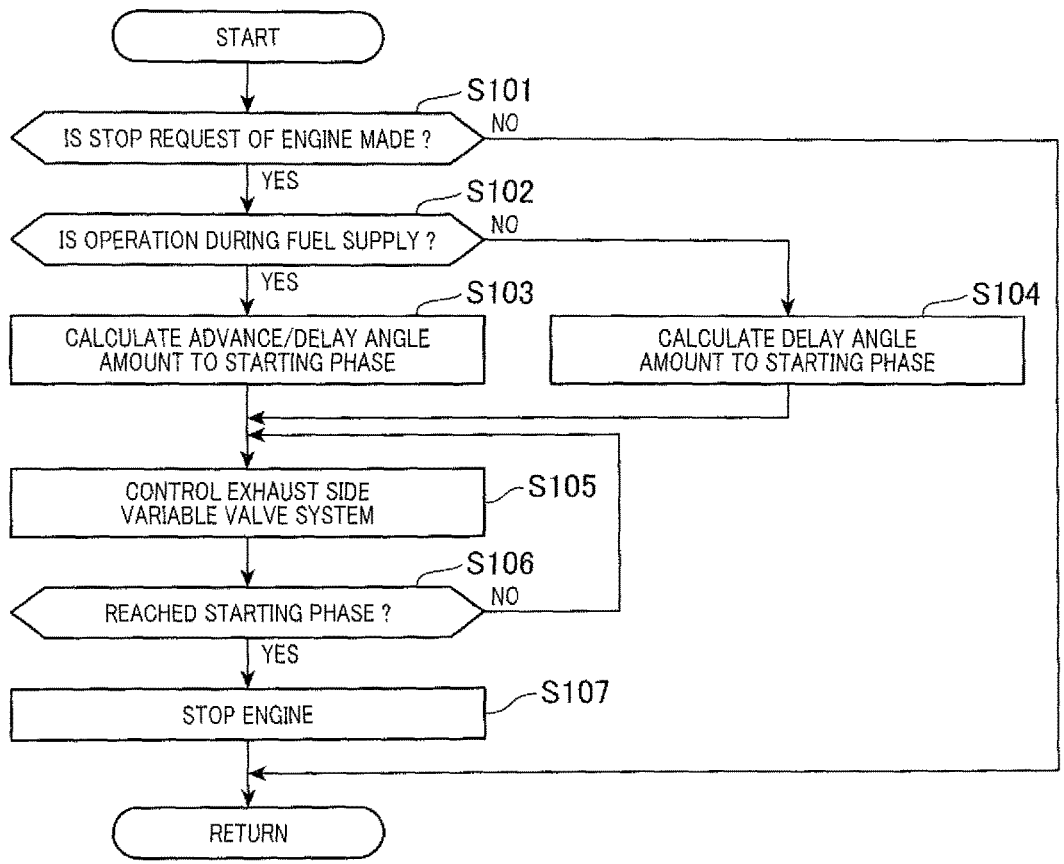
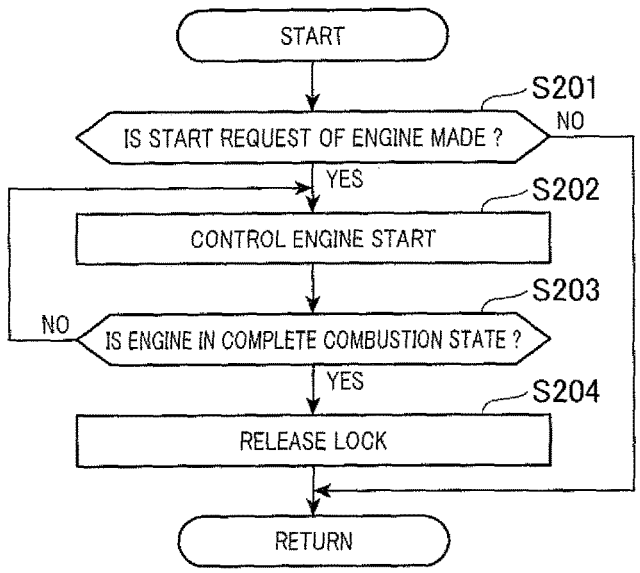

FIG.14
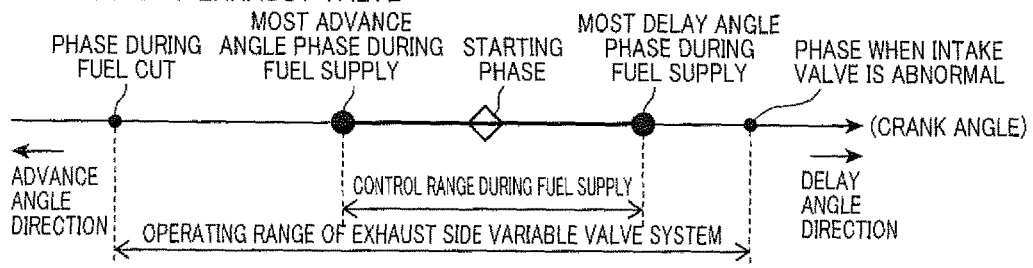
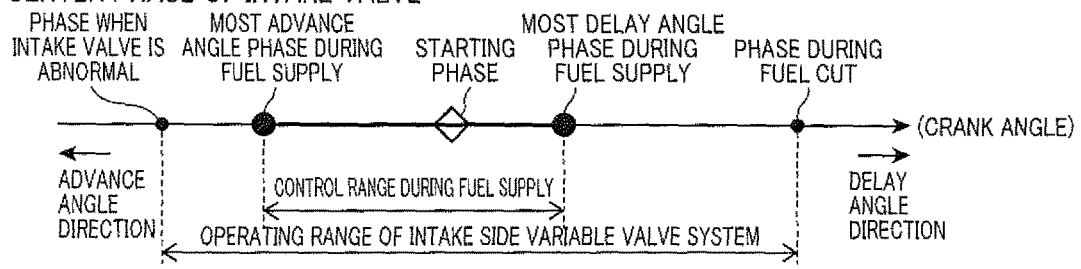
FIG.15
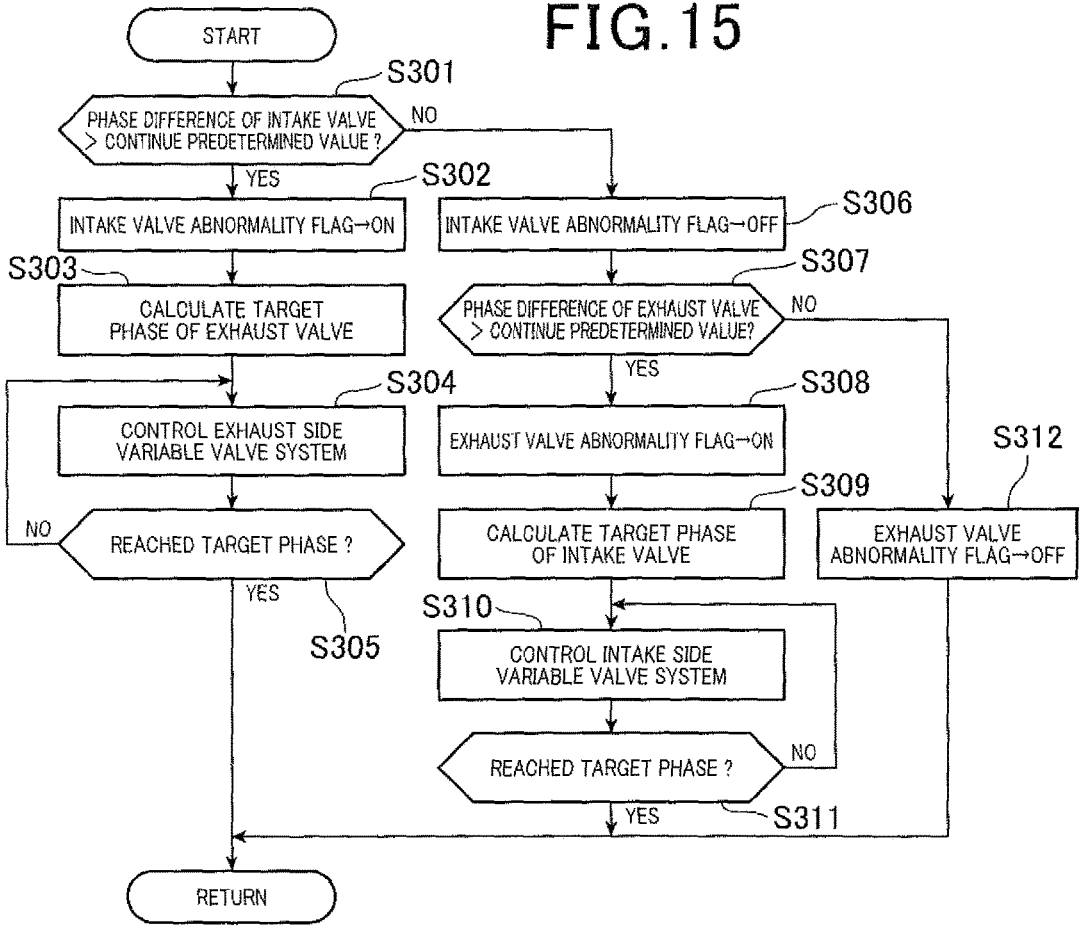

CONTROL SYSTEM FOR INTERNAL COMBUSTION ENGINE

CROSS-REFERENCE TO RELATED APPLICATION

This application is based on and claims the benefit of priority from earlier Japanese Patent Applications No. 2014-99794 filed May 13, 2014, and No. 2015-95141 filed May 7, 2015, the descriptions of which are incorporated herein by reference.

TECHNICAL FIELD

The present disclosure relates to a control system for an internal combustion engine.

BACKGROUND

Conventionally, as a control system for a purpose of reducing a pumping loss of an internal combustion engine, there is a control system disclosed in Japanese Patent Application Laid-Open Publication No. 2001-164970, for example.

The control system disclosed in the Publication '970 has a detector that detects whether a fuel supply is stopped while a vehicle is travelling, and a detector that detects a catalyst temperature of an exhaust system.

An intake air amount of the internal combustion engine is increased when the fuel supply is stopped and the catalyst temperature is higher than a predetermined value.

The pumping loss is reduced by performing this control, and it is possible to increase an electrical power generation amount during regeneration of a generator connected with the internal combustion engine.

In the control system disclosed in the Publication '970, the control for reducing the pumping loss is performed when the catalyst temperature is higher than the predetermined value, and the control for reducing the pumping loss is not performed when the catalyst temperature is lower than the predetermined value.

Thus, although the catalyst temperature can be suppressed from dropping, an effect of reducing the pumping loss is limited.

SUMMARY

An embodiment provides a control system capable of suppressing a catalyst temperature from dropping, while further reducing a pumping loss of an internal combustion engine.

In a control system for an internal combustion engine according to a first aspect, the control system includes an intake valve, an exhaust valve, and an exhaust purifying catalyst that purifies exhaust gas after combustion of a fuel.

During a fuel cut in which no fuel is supplied, a closing timing of the intake valve is controlled to a delayed angle side more than at a timing when the fuel is supplied and to a delayed angle side more than at a timing at a bottom dead center of an intake stroke, and an opening timing of the exhaust valve is controlled to an advanced angle side more than at the timing when the fuel is supplied and to an advanced angle side more than at the timing at the bottom dead center of an expansion stroke.

Since the amount of blow-back of intake air into an intake pipe can be increased in a compression stroke by controlling the closing timing of the intake valve to the delayed angle side more than at the timing when the fuel is supplied, the amount of the intake air is reduced.

Thereby, an amount of the exhaust gas flowing into the exhaust gas purifier can also be reduced.

On the other hand, during a subsequent expansion stroke, since the air volume is insufficient relative to the cylinder volume due to the reduction in the intake air amount, the pressure inside the cylinder becomes negative, and pumping loss increases.

In the above configuration, the exhaust valve is controlled to the advanced angle side more than at the timing when the fuel is supplied and to the advanced angle side more than at the timing at the bottom dead center in the expansion stroke relative to the delay angle of the closing timing of the intake valve.

Therefore, the exhaust valve is in an open state earlier in the expansion stroke, and it becomes possible to reduce negative pressure in the cylinder in the expansion stroke.

Therefore, while suppressing the catalyst temperature from dropping due to the exhaust gas (air) when the fuel is not burned flowing into the exhaust purifying catalyst, it is possible to reduce the pumping loss.

In the control system for the internal combustion engine according to a second aspect, the control system includes an intake valve, an exhaust valve, and an exhaust purifying catalyst that purifies exhaust gas after combustion of a fuel.

During a fuel cut in which no fuel is supplied, negative pressure generated in a cylinder during an expansion stroke by controlling a closing timing of the intake valve to a delayed angle side more than at a timing when the fuel is supplied and to a delayed angle side more than at a timing at a bottom dead center of an intake stroke is reduced by controlling an opening timing of the exhaust valve.

The exhaust gas in a second half of an exhaust stroke is confined in the cylinder by controlling the closing timing of the exhaust valve to the advanced angle side more than at the timing when the fuel is supplied, so that it is possible to reduce the exhaust gas flowing into an exhaust pipe.

On the other hand, at this time, air is compressed by confining the exhaust gas inside the cylinder, thus the pumping loss increases.

In the above configuration, the compressed air in the cylinder during the intake stroke can be used for expanding the volume of the cylinder by controlling the opening timing of the intake valve to the delayed angle side relative to controlling the closing timing of the exhaust valve to the advanced angle side.

Therefore, while suppressing the catalyst temperature from dropping, due to the exhaust gas flowing into the exhaust pipe, it is possible to reduce the pumping loss.

BRIEF DESCRIPTION OF THE DRAWINGS

In the accompanying drawings:

FIGS. 9A and 9B show schematic views of an exhaust side variable valve system;

FIG. 10 shows diagrams describing center phases of each intake and exhaust valve during a control in a second embodiment;

FIG. 12 shows a flow chart showing a series of processes when an internal combustion engine is stopped in the second embodiment;

FIG. 13 shows a flow chart showing a series of processes when the internal combustion engine is started in the second embodiment;

FIG. 14 shows diagrams describing center phases of each intake and exhaust valves during a control in a third embodiment; and FIG. 15 is a flowchart showing a series of processes in the third embodiment.

DETAILED DESCRIPTION OF THE PREFERABLE EMBODIMENT

First Embodiment

With reference to the drawings, hereinafter will be described an embodiment of the present disclosure.

The present embodiment provides a control system using a four-cycle engine that is an internal combustion engine, and the control system for the internal combustion engine is assumed to be mounted on a vehicle.

Figure 1:
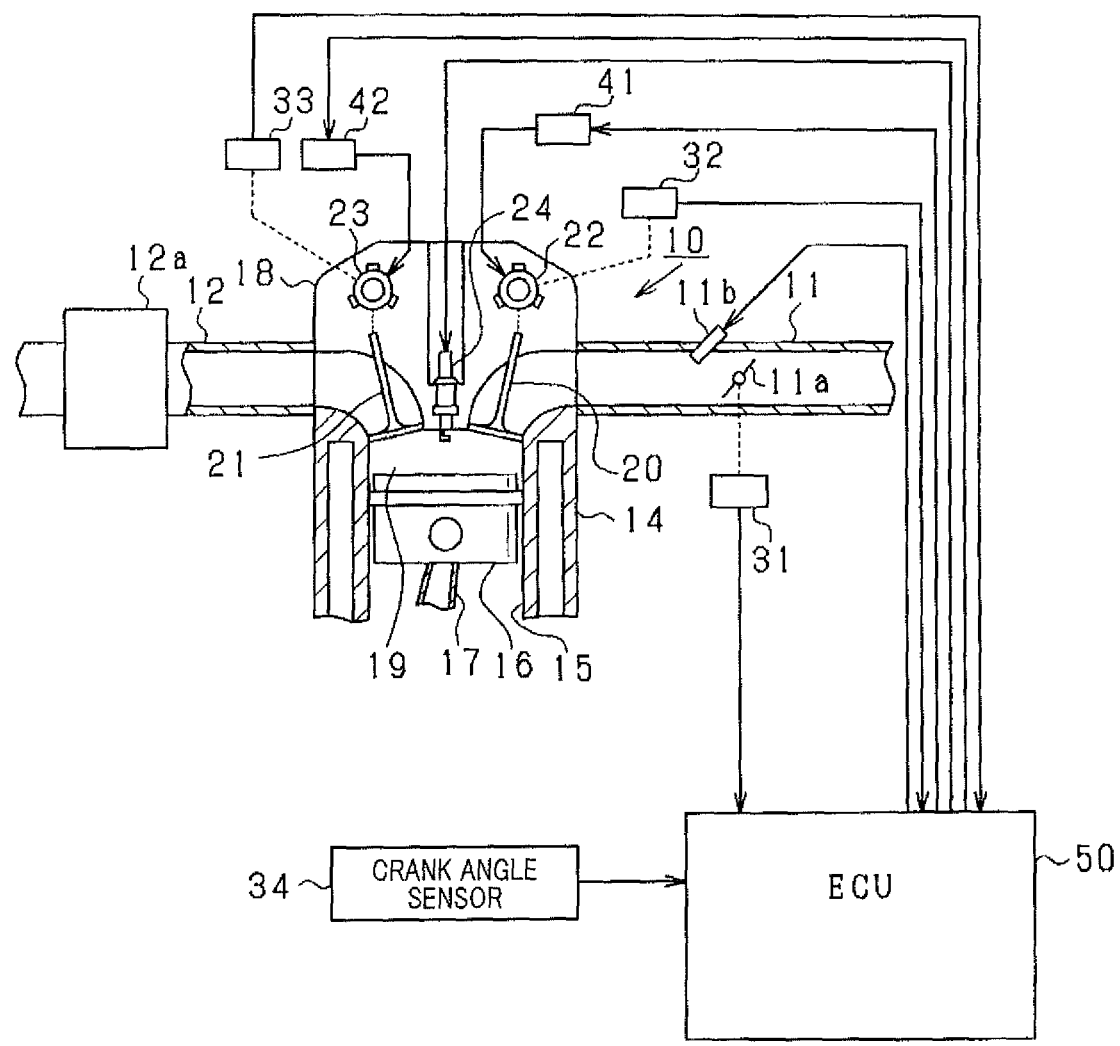
FIG. 1 shows a schematic diagram of a control system for an internal combustion engine according to an embodiment.

FIG. 1 shows an overall schematic configuration of the control system for the internal combustion engine.

An intake pipe 11 and an exhaust pipe 12 are connected to an intake port and an exhaust port of the internal combustion engine 10, respectively.

A throttle valve 11a electronically controlled based on an operation amount of a gas pedal (not shown) and an electromagnetic drive type injector 11b to which a high pressure fuel is supplied from a fuel supply system (not shown) are disposed in the intake pipe 11.

On the other hand, an exhaust gas purifier 12a is disposed in the exhaust pipe 12.

An opening of the throttle valve 11a (throttle opening) is detected by a throttle sensor 31, and is detected also that the throttle is fully closed by the throttle sensor 31.

In addition, the throttle opening is represented by an angle with respect to a vertical direction of the intake pipe 11.

In other words, 0 degree indicates that the throttle is fully closed, while 90 degrees indicates that the throttle is fully open.

The injector 11b injects the fuel into the intake pipe 11 when energized.

The exhaust gas purifier 12a is provided with an exhaust purifying catalyst therein, and purifies the exhaust gas by oxidizing and/or reducing the exhaust gas discharged through the exhaust pipe 12 after combustion of the fuel.

In addition, oxidation efficiency and/or reduction efficiency of the exhaust gas are reduced in the exhaust purifying catalyst when a catalyst temperature is lower than an optimum temperature.

That is, the purification of the exhaust gas is not performed sufficiently when the catalyst temperature is lower than the optimum temperature.

A cylinder 15 is formed in a cylinder block 14, and a piston 16 that reciprocates in an axial direction of the cylinder 15 is disposed within the cylinder 15.

The piston 16 is connected to a crank shaft (not shown) through a connecting rod 17.

A combustion chamber 19, which is partitioned and formed by the cylinder 15 and the cylinder head 18, is provided above the piston 16 in FIG. 1, and the combustion chamber 19 communicates with the intake pipe 11 and the exhaust pipe 12 via an intake valve 20 and an exhaust valve 21, respectively.

A spark plug 24 is disposed in the cylinder head 18.

The spark plug 24 is ignited by a high voltage current for ignition supplied from an igniter (not shown).

In addition, although it is assumed that the injector 11b is disposed in the intake pipe 11, it may be configured to dispose the injector 11b to the cylinder head 18 and inject the fuel directly into the combustion chamber 19.

A crank angle sensor 34 for detecting a rotational position of the crankshaft (not shown) is disposed to the crank shaft.

Moreover, the crankshaft is connected to a generator, and the generator is assumed to perform electric power regeneration during a fuel cut in which no fuel is supplied.

An intake camshaft 22 for opening and closing the intake valve 20 at a predetermined timing and an exhaust camshaft 23 for opening and closing the exhaust valve 21 at a predetermined timing are connected to the crankshaft via a timing belt or the like (not shown).

An intake camshaft phase sensor 32 for detecting a phase of the intake camshaft 22 is disposed to the intake camshaft 22, and an exhaust camshaft phase sensor 33 for detecting a phase of the exhaust camshaft 23 is disposed to the exhaust camshaft 23.

An intake side variable valve system 41 is disposed on the intake camshaft 22, and an exhaust variable valve system 42 is disposed on the exhaust camshaft 23.

The intake variable valve system 41 and the exhaust variable valve system 42 respectively change a relative rotational phase between the intake camshaft 22, the exhaust camshaft 23 and the crankshaft by adjusting center phases of the intake camshaft 22 and the exhaust camshaft 23.

In other words, the intake variable valve system 41 and the exhaust side variable valve system 42 can be said to be a center phase changing system.

The intake camshaft 22 and the exhaust camshaft 23 rotate to a delayed angle side or an advanced angle side relative to the crank shaft in accordance with the control amount of the intake variable valve system 41 and the exhaust variable valve system 42, and opening and closing timings of the intake valve 20 and the exhaust valve 21 shift to the delayed angle side or the advanced angle side in accordance with the rotation of the intake camshaft 22 and the exhaust camshaft 23.

The control system for the internal combustion engine has a control unit 50. Detected signals of the various sensors mentioned above are inputted into the controller 50, and engine conditions such as an intake air amount, throttle opening, or engine speed are detected based on the detected signals.

Further, the control unit 50 executes a control of the fuel injection by the injector 11b, an opening control of the throttle valve 11a, a control of the ignition timing by the ignition plug 24, a control of the opening and closing timing of the intake valve 20 by the intake variable valve system 41, a control of the opening and closing timing of the exhaust valve 21 by the exhaust side variable valve system 42, and the like.

Figure 2:
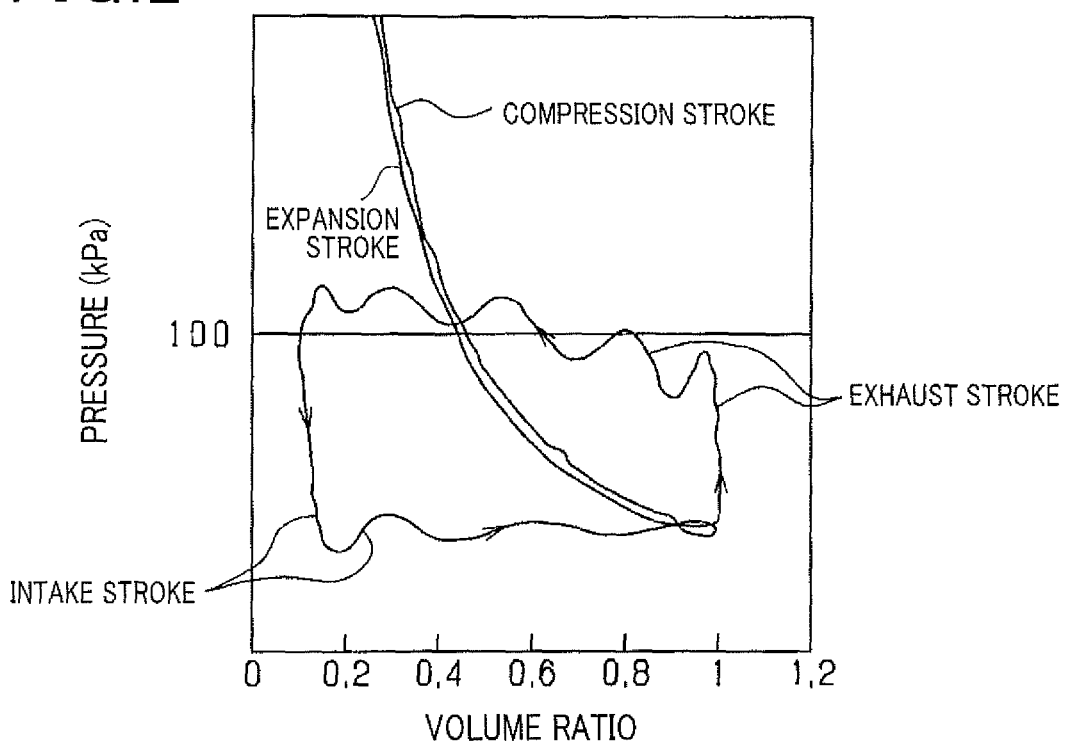
FIG. 2 shows an air cycle in a case where a throttle opening is set to 5.5 degrees during a fuel cut.

FIG. 2 shows an air cycle in a case where the throttle opening is set to 5.5 degrees, i.e., a substantially fully closed during a fuel cut in which no fuel injection is performed.

Since the throttle opening is small, the intake air amount is reduced during the intake stroke, so that the pressure within the cylinder 15 becomes negative relative to atmospheric pressure (100 kPa).

As a result, a momentum of the intake valve 20 increases, thus a pumping loss increases.

Figure 3:
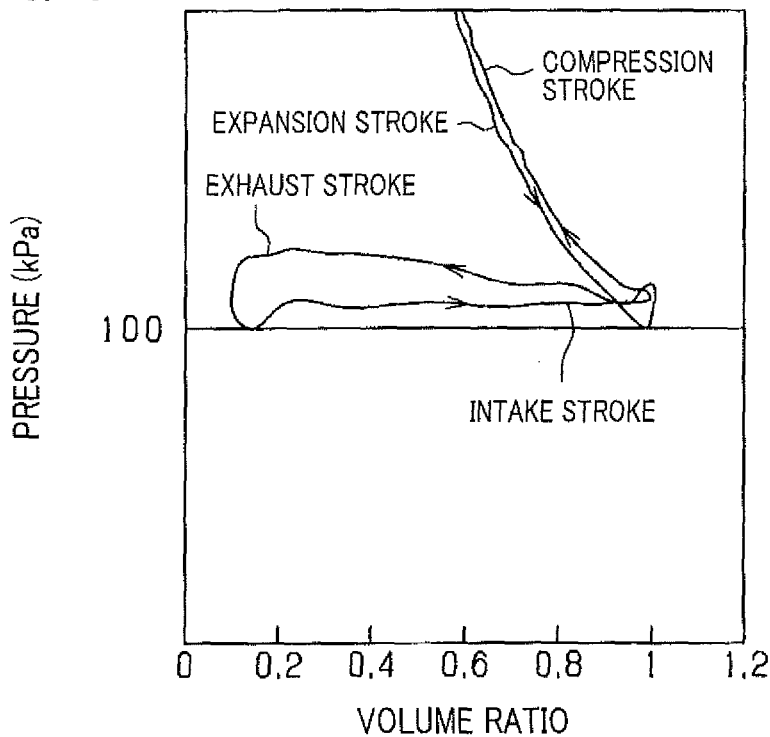
FIG. 3 shows an air cycle in the case where the throttle opening is set to 80 degree at during the fuel cut.

FIG. 3 shows an air cycle in a case where the throttle opening is set to 84 degrees, i.e., a substantially fully opened during the fuel cut in which no fuel injection is performed.

Since the throttle opening is large, the pressure difference between the inside and outside of the cylinder 15 is reduced.

Thus, an increase of the momentum of the intake valve 20 becomes small, and accordingly, the pumping loss can be reduced.

On the other hand, since an amount of the intake air increases, an amount of a discharged air also increases accordingly.

Meanwhile, what is discharged from the combustion chamber 19 to the exhaust pipe 12 during the fuel cut is air having temperature lower than the exhaust gas generated with the fuel combustion.

As mentioned above, oxidation efficiency and/or reduction efficiency of the exhaust gas of the exhaust purifying catalyst inside the exhaust gas purifier 12*a* are dropped following the dropping of the catalyst temperature.

Therefore, although a reduction in pumping loss is possible when the throttle is almost fully opened during fuel cut, it causes dropping in the temperature of the exhaust purifying catalyst, and when the supply of fuel is resumed, it is difficult to purify exhaust gas sufficiently.

Figure 4:
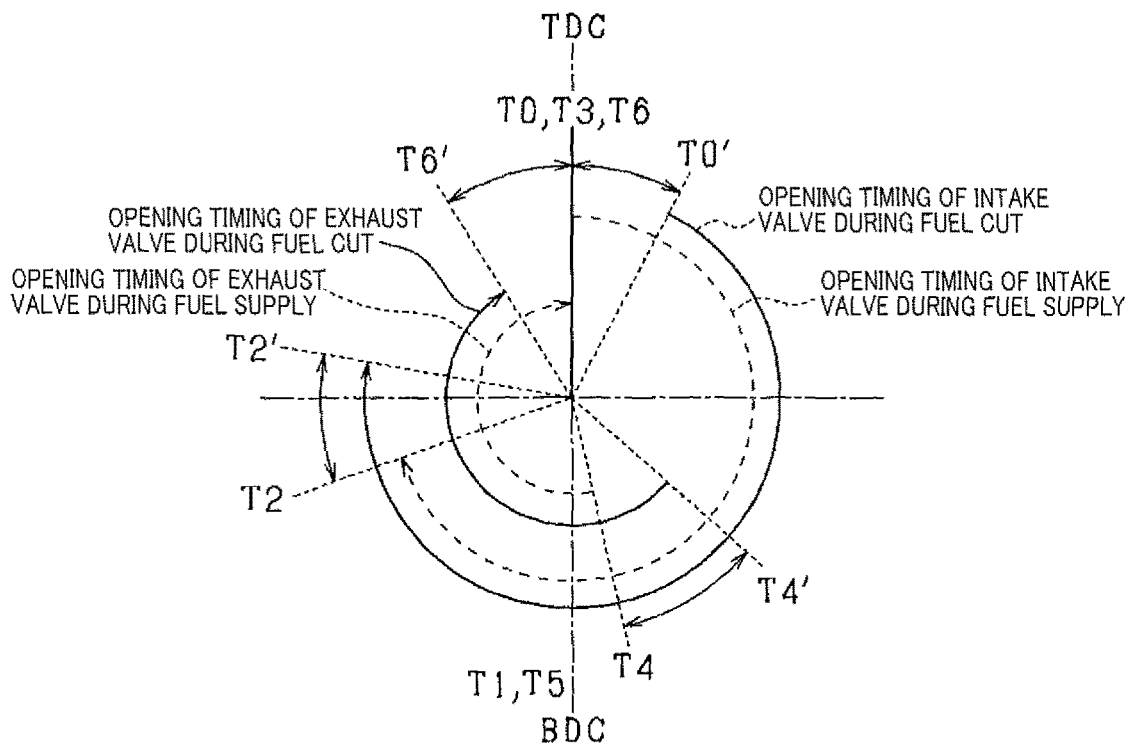
FIG. 4 shows a diagram of valve timing.

FIG. 4 shows a diagram of valve timing in the control system of the internal combustion engine 10 according to the present embodiment.

In FIG. 4, valve timing during the fuel supply is indicated by a broken line, and valve timing during the fuel cut is indicated by a solid line.

The valve timing during the fuel supply is described hereafter.

First, the intake valve 20 is opened at a timing T0 where the piston 16 is positioned at the top dead center (TDC), and is closed at a timing T2 that is at a delayed angle side of a timing T1 where the piston 16 is positioned at the bottom dead center (BDC).

At this time, the fuel is injected from the injector 11*b* matching the opening of the intake valve 20, is mixed with the air flowing from the intake pipe 11 to become a gas mixture, and the gas mixture is supplied into the combustion chamber 19.

Next, from T2 to a timing T3 where the piston 16 is positioned at the top dead center, the air in the combustion chamber 19 is compressed, while in a vicinity of the timing T3 where the piston 16 is positioned at the top dead center, high voltage for ignition is supplied to the spark plug 24 to cause ignition, and the fuel in the combustion chamber 19 is burned.

By the combustion of the fuel in the combustion chamber 19, the piston 16 is lowered from T3 to a timing T5 where the piston 16 is positioned at the lower dead point and the volume of the combustion chamber 19 expands.

At this time, the exhaust valve 21 is opened at a timing T4 that is an advanced angle side of the timing T5 where the piston 16 is positioned at the bottom dead center.

After the opening of the exhaust valve 21, the exhaust gas in the combustion chamber 19 is discharged into the exhaust pipe 12 through the exhaust port following the rise of the piston 16 between the timing T5 where the piston 16 is positioned at the bottom dead center and the timing T6 where the piston 16 is positioned at the top dead center to.

Then, the exhaust valve 21 is closed at the timing T6.

It should be noted that the timing T0 and the timing T6 are equal timings.

By repeating the process from the timing T0 through the timing T6 (=T0), the internal combustion engine 10 generates power.

Next, the valve timing during the fuel cut is described.

During the fuel cut, a delay angle control for controlling the opening and closing timing of the intake valve 20 to the delayed angle side, and an advance angle control for controlling the opening and closing timing of the exhaust valve 21 to the advanced angle side are performed.

First, the intake valve 20 is opened at a timing where the intake valve 20 is opened during the fuel supply, that is, at a timing T0' that is the delayed angle side of the timing T0 where the piston 16 is positioned at the top dead center.

On the other hand, the intake valve 20 is closed at a timing T2' that is the delayed angle side of the timing T1 where the piston 16 is positioned at the bottom dead center and the timing T2 where the intake valve 20 is closed during the fuel supply.

Further, the exhaust valve 21 is opened at a timing T4' that is on the advanced angle side of the timing T5 where the piston 16 is positioned at the bottom dead center and the timing T4 where the exhaust valve 21 is opened during the fuel supply.

On the other hand, the exhaust valve 21 is closed at a timing where the exhaust valve 21 is closed during the fuel supply, that is, at a timing T6' that is on the advanced angle side of the timing T6 where the piston 16 is positioned at the top dead center.

Meanwhile, as described above, the delay angle control and the advance angle control are performed by varying the center phases of the opening and closing timings of the intake valve 20 and the exhaust valve 21 by the intake variable valve system 41 and the exhaust variable valve system 42 that function as the center phase changing system.

Therefore, the phase difference between T0 and T0' and the phase difference between T2 and T2' are the same phase difference, while the phase difference between T4 and T4' and the phase difference between T6 and T6' are the same phase difference.

Figure 5:
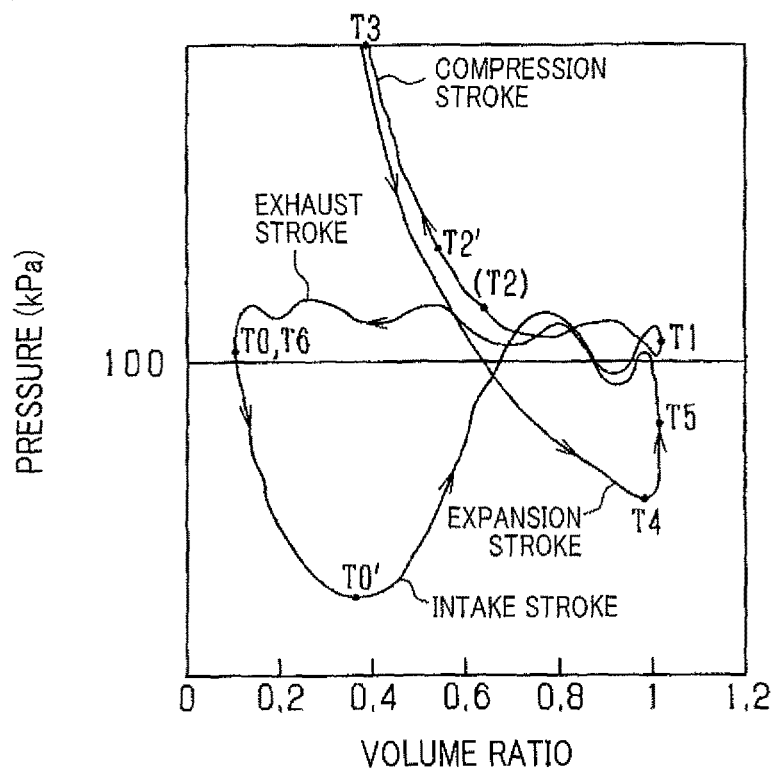
FIG. 5 shows an air cycle in a case of performing only a delay angle control of an intake valve during the fuel cut.

FIG. 5 shows an air cycle during the fuel cut where no fuel is injected when the throttle opening is set to 84 degrees, the delay angle control of the intake valve 20 is performed, and no advance angle control of the exhaust valve 21 is performed, that is, the opening timing of the intake valve 20 is set from T0' to T2', and the opening timing of the exhaust valve 21 is set from T4 to T6.

A period T1 to T2' where blow-back of the intake air into the intake pipe 11 occurs in the compression stroke is produced by delaying the closing timing of the intake valve 20 from the timing when the fuel is supplied.

Therefore, the period during which blow-back occurs is extended, and an amount of the blow-back of intake air into the intake pipe 11 increases.

Thereby, the amount of the intake air is reduced, and the amount of discharged air sent to the exhaust gas purifier 12a can also be reduced.

On the other hand, during a subsequent expansion stroke (T3-T4-T5), pressure inside the cylinder 15 becomes negative because the volume of the air is insufficient relative to the volume of the cylinder 15 due to a reduction in the intake air amount.

Thus, the pumping loss increases.

Moreover, since the opening timing of the intake valve 20 is set to T0' that is the delayed angle side of the timing T0 where the piston 16 is positioned at the bottom dead center, the intake valve 20 will not be opened until the piston 16 lowers by a predetermined amount.

That is, the air in the combustion chamber 19 expands until the timing T0' where the intake valve 20 is opened, and accordingly, the pressure of the combustion chamber 19 becomes negative.

Therefore, since the intake valve 20 is opened at T0' where the pressure of the combustion chamber 19 becomes negative, pumping loss due to the opening of the intake valve 20 occurs.

Figure 6:
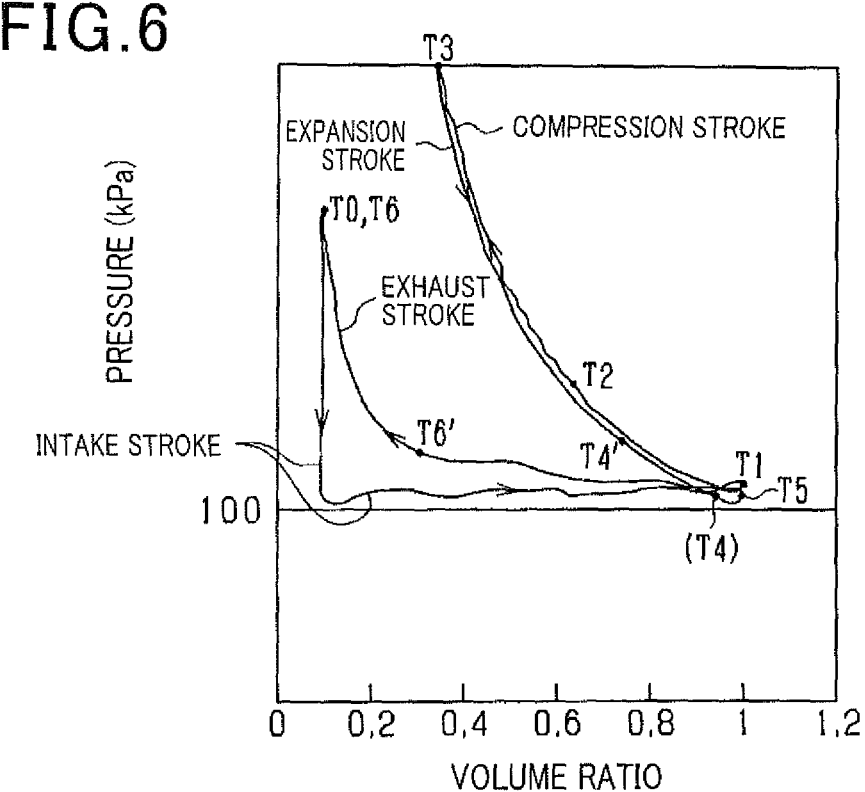
FIG. 6 shows an air cycle in a case of performing only an advance angle control of an exhaust valve during the fuel cut.

FIG. 6 shows an air cycle during the fuel cut during which no fuel is injected when the throttle opening is set to 84 degrees, the advance angle control of the exhaust valve 21 is performed, and no delay angle control of the intake valve 20 is performed, that is, the opening timing of the intake valve 20 is set from T0 to T2, and the opening timing of the exhaust valve 21 is set from T4' to T6'.

The exhaust valve 21 is closed before T6 that is the timing where the piston 16 reaches the top dead center by controlling the closing timing of the exhaust valve 21 to the advanced angle side more than at timing when the fuel is supplied.

Therefore, the exhaust gas in the second half of the exhaust stroke (T6' to T6) is confined in the cylinder 15, and it is possible to reduce the amount of air discharged into the exhaust pipe 12.

On the other hand, at this time, exhaust gas is confined inside the cylinder 15 to generate compressed air, and the cylinder pressure increases.

Thus, the pumping loss increases.

Figure 7:
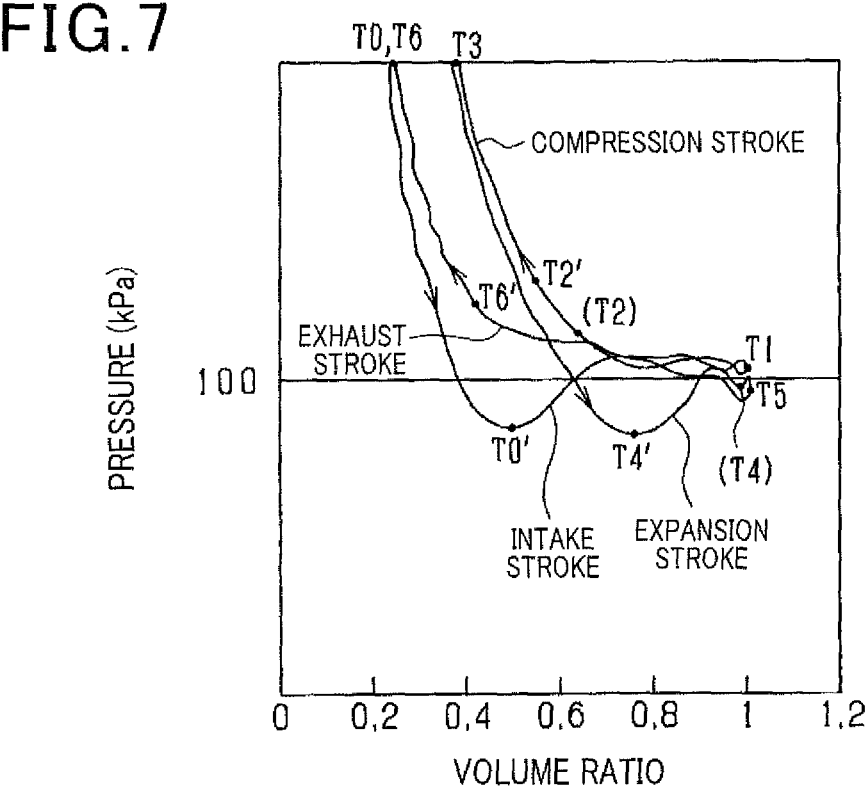
FIG. 7 shows an air cycle in a case of performing the delay angle control of the intake valve and the advance angle control of the exhaust valve during the fuel cut.

FIG. 7 shows an air cycle during the fuel cut during which no fuel is injected when the throttle opening is set to 84 degrees, and both the advance angle control of the exhaust valve 21 and the delay angle control of the intake valve 20 are performed, that is, the opening timing of the intake valve 20 is set from T0' to T2', and the opening timing of the exhaust valve 21 is set from T4' to T6'.

The period where the blow-back of the intake into the intake pipe 11 occurs in the compression stroke becomes T1 to T2' by controlling the closing timing of the intake valve 20 to the delayed angle side more than at the timing when the fuel is supplied.

Therefore, the period that blow-back occurs is extended, and the amount of the blow-back of the intake air into the intake pipe 11 increases.

Thereby, an amount of the intake air is reduced, and an amount of a discharged air flowing into the exhaust gas purifier 12a can also be reduced.

On the other hand, during a subsequent expansion stroke (T3-T4'-T4-T5), although the volume of the air is not enough relative to the volume of the cylinder 15 due to the reduction in the intake air amount, the exhaust valve 21 is opened at the timing T4' that is the delayed angle side more than at the opening timing of the exhaust valve 21 when the fuel is supplied.

Therefore, negative pressure generated in the cylinder becomes limited, and the pumping loss is reduced.

Moreover, the exhaust valve 21 is closed before T6 that is the timing where the piston 16 reaches the top dead center by controlling the closing timing of the exhaust valve 21 to the advanced angle side more than at the timing when the fuel is supplied.

As a result, the exhaust gas in the second half of the exhaust stroke (T6' to T6) is confined in the cylinder 15, and it is possible to reduce the amount of the air discharged into the exhaust pipe 12.

On the other hand, the intake valve 20 is opened at the timing T0' that is the delayed angle side of the timing T0 (=T6) where the piston 16 reaches the top dead center, that is, the volume of the combustion chamber 19 inflates until it reaches the timing T0' where the intake valve 20 is opened.

At this time, it is possible to use the compressed air generated during the second half of the exhaust stroke (T6' to T6) for the expansion of the combustion chamber 19 due to the lowering of the piston 16 in the period of T0 to T0'.

Furthermore, since the intake valve 20 is opened in a state where the volume of the combustion chamber 19 is inflated by the compressed air, the pressure difference between the combustion chamber 19 relative to the atmospheric pressure at the opening timing of the intake valve 20 becomes small, thus the pumping loss is reduced.

Figure 8:
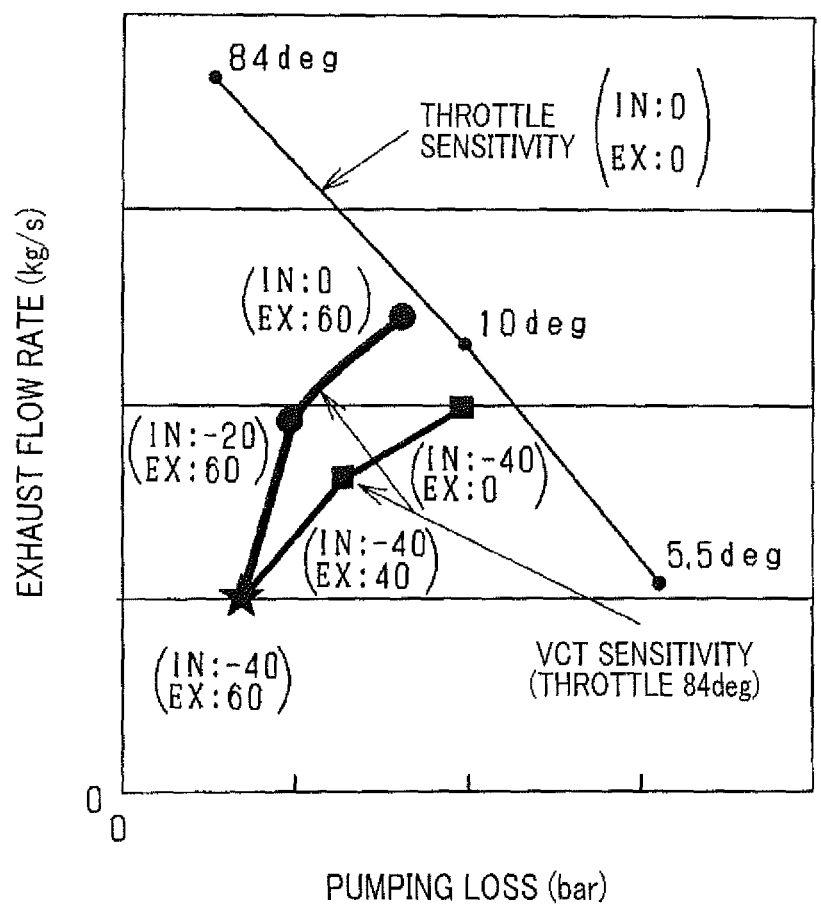
FIG. 8 shows an exhaust flow rate and pumping loss in a case of performing the control according to a first embodiment.

FIG. 8 shows the exhaust flow rate and the pumping loss when the throttle opening is varied and when the advance angle control and/or the delay angle control are performed.

In FIG. 8, the pumping loss is shown in a horizontal direction, and the exhaust flow rate indicating the exhaust air amount per unit time is shown in a vertical direction.

In the drawing, the pumping loss and the exhaust flow rate are shown as throttle sensitivity in association with a detected value of the throttle sensor 31 in the case of varying the throttle opening when the advance angle control of the intake valve 20 and the delay angle control of the exhaust valve 21 are not performed (IN: 0, EX: 0).

Further, the pumping loss and the exhaust flow rate are shown as a valve cam timing (VCT) sensitivity in association with the detected values of the intake camshaft phase sensor 32 and the exhaust camshaft phase sensor 33 in the case of setting the throttle opening to 84 degrees, and performing the advance angle control of the intake valve 20 and/or the delay angle control of the exhaust valve 21.

As described above, when the throttle opening is set to 5.5 degrees which is a value close to fully closed, although the exhaust flow rate can be suppressed from increasing, the pumping loss increases as shown in FIG. 2.

On the other hand, when the throttle opening is set to 84 degrees which is a value close to fully opened, although the pumping loss is reduced, the exhaust gas flow rate increases as shown in FIG. 3.

Further, when the throttle opening is set to 84 degrees which is the value close to fully opened, and even when performing only the delay angle control of the intake valve 20 (IN: −40, EX: 0), or performing only the advance angle control of the exhaust valve 21 (IN: 0, EX: 60), the pumping loss increases and the effect of suppressing the exhaust gas flow rate from increasing is limited as shown in FIG. 5 and FIG. 6, respectively.

For the case of performing only the delay angle control of the intake valve 20, the effect of reducing the pumping loss and the suppressing effect of the exhaust flow rate increase as an advancing amount of the advance angle control of the exhaust valve 21 increases (IN: −40, EX: 40).

Further, for the case of performing only the advance angle control of the exhaust valves 21, the effect of reducing the pumping loss and the suppressing effect on the exhaust gas flow rate also increase when a delay angle amount of the delay angle control of the intake valve 20 (IN: −20, EX: 60) increases.

Furthermore, the exhaust flow rate becomes equivalent to that of a case when the throttle opening is set to 5.5 degrees which is the value close to fully closed, and the pumping loss becomes equivalent to that of a case when the throttle opening is set to 84 degrees which is the value close to fully opened when performing the delay angle control of the intake valve 20 and the advance angle control of the exhaust valve 21 sufficiently (IN: −40, EX: 60).

With the above configuration, the control system 50 for the internal combustion engine 10 according to the present embodiment has following effects.

Since the amount of the blow-back of the intake air into the intake pipe 11 increases in the compression stroke by controlling the closing timing of the intake valve 20 to the delayed angle side more than at the timing when the fuel is supplied, the amount of the intake air is reduced, thus the amount of the exhaust gas flowing into the exhaust gas purifier 12*a* can also be reduced.

On the other hand, during a subsequent expansion stroke, since the volume of the air is not enough relative to the volume of the cylinder 15 due to the reduction in the intake air amount, inside the cylinder 15 becomes negative pressure, and the pumping loss increases.

In the above configuration, since the exhaust valve 21 is controlled to the advanced angle side more than at the timing when the fuel is supplied and to the advanced angle side more than at the timing at a bottom dead center in the expansion stroke relative to the delay angle of the closing timing of the intake valve 20, the exhaust valve 21 is in an open state earlier in the expansion stroke, and it becomes possible to reduce negative pressure in the cylinder 15 in the expansion stroke.

Therefore, while suppressing the catalyst temperature from dropping due to the exhaust gas when the fuel is not burned flowing into the exhaust purifying catalyst, it is possible to reduce the pumping loss.

The exhaust gas in the second half of the exhaust stroke is confined in the cylinder 15 by controlling the closing timing of the exhaust valve 21 to the advanced angle side more than at timing when the fuel is supplied, so that it is possible to reduce the exhaust gas flowing into the exhaust pipe 12.

On the other hand, at this time, the air is compressed by confining the exhaust gas inside the cylinder 15, thus the pumping loss increases.

In this respect, in the above configuration, the compressed air in the cylinder 15 during the intake stroke can be used for expanding the volume of the cylinder 15 by controlling the opening timing of the intake valve 20 to the delayed angle side relative to controlling the closing timing of the exhaust valve 21 to the advanced angle side.

Therefore, while suppressing the catalyst temperature from dropping due to the exhaust gas flowing into the exhaust pipe 12, it is possible to reduce the pumping loss.

When the intake valve 20 is opened in a state where the pressure in the cylinder 15 is high, noise is generated because the compressed air is released from the intake valve 20.

Since the compressed air is used for expanding the volume of the cylinder 15 during the intake stroke, the compressed air is prevented from being released from the intake valve 20, and thus it is possible to suppress the noise from being generated.

The control for the purpose of reducing the exhaust gas flowing into the exhaust pipe 12 and reducing the pumping loss is realized by controlling the opening timing and the closing timing of the exhaust valve 21 both to the advanced angle side, and the opening timing and the closing timing of the intake valve 20 both to the delayed angle side by using the center phase control mechanism.

Therefore, the control for the purpose of reducing the exhaust gas flowing into the exhaust pipe 12 and reducing the pumping loss is realized by using a variable valve system that varies only the center phase of the opening and closing timing without employing a variable valve system that can freely vary a lift amount and a phase of the intake valve 20 and the exhaust valve 21.

Since the pumping loss is reduced during the fuel cut, it is possible to increase efficiency of the electric power regeneration in the generator connected to the crankshaft.

In addition, it is possible to enhance the fuel economy of the vehicle, accordingly.

Second Embodiment

It should be appreciated that, in the second embodiment and the subsequent embodiments, components identical with or similar to those in the first embodiment are given the same reference numerals, and structures and features thereof will not be described in order to avoid redundant explanation.

In the present embodiment, a part of a control is added to the control that the control system 50 according to the first embodiment performs.

Further, in the present embodiment, an electric type is employed for the intake side variable valve system 41 that changes the center phase of the intake valve 20, and a hydraulic type is employed for the exhaust side variable valve system 42 that changes the center phase of the exhaust valve 21.

Schematic views of the exhaust side variable valve system 42 that is the hydraulic type are shown in FIGS. 9A and 9B.

A housing 61 of the exhaust side variable valve system 42 is fixed to a sprocket 62 that is rotatably supported on an outer periphery of the intake cam shaft 22.

Thereby, rotation of the crank shaft is transmitted to the housing 61 and the sprocket 62, and the housing 61 and the sprocket 62 rotate synchronously with the crank shaft.

In other words, the intake cam shaft 22 rotates synchronously with the crank shaft.

Further, a rotor 64 is fixed to one end of the intake cam shaft 22, and the rotor 64 is relatively rotatably accommodated in the housing 61.

Inside the housing 61 is divided into an advance angle chamber 65 and a delay angle chamber 66 by the rotor 64.

The rotor 64 is regulated to operate in between the most advance angle phase and the most delay angle phase.

Further, a communication passage 67 that allows entry and exit of the oil between the advance angle chamber 65 and the delay angle chamber 66 is provided on the rotor 64.

A mechanism for locking the center phase of the exhaust valve 21 to be a starting phase, which is a phase when starting the internal combustion engine 10, is provided to the exhaust side variable valve system 42.

In this mechanism, a lock pin 68 for locking the relative rotation between the housing 61 and the sprocket 62 with the rotor 64 is disposed in the rotor 64.

The lock pin 68 is disposed projectably, and by the lock pin 68 being projected to the sprocket 62 side and fitted into a lock hole 63 formed in the sprocket 62, the center phase is locked in the starting phase, as shown in FIG. 9B.

Further, the lock pin 68 is urged in a locking direction (projecting direction) by a spring 69.

Incidentally, it may be configured to dispose the locking hole 63 in the housing 61.

In addition, an urging member 70 such as a torsion coil spring for assisting the hydraulic pressure for relatively rotating the rotor 64 in an advance angle direction by the spring force during an advance angle control is provided in the housing 61.

A range that the urging member 70 acts across is set in a range from the most delayed angle phase up to the starting phase, and acts as a fail-safe when restarting after an abnormal stop of the internal combustion engine 10.

That is, when the engine is started at a phase closer to the delayed angle side phase more than at the starting phase in a state where the lock pin 68 is disengaged from the lock hole 63, an advance angle operation that advances the phase from the delayed angle side to the engine starting phase is assisted by the urging force of the urging member 70.

Then, the exhaust side variable valve system 42 is configured to be locked by fitting the lock pin 68 in the lock hole 63.

On the other hand, when the engine is started at a phase closer to the advanced angle side phase more than at the starting phase, since a torque of the exhaust camshaft 23 acts on the delay angle direction during the cranking (starting the engine), the lock pin 68 can be locked by fitting the lock pin 68 into the lock hole 63 by delaying the center phase to the starting phase from the advanced angle side by the torque of the exhaust camshaft 23.

Furthermore, as shown in FIG. 9A, when the lock pin 68 is disengaged from the lock hole 63, the communication passage 67 between the advance angle chamber 65 and the delay angle chamber 66 is maintained being blocked by the lock pin 68.

When advancing the center phase of the exhaust valve 21, oil supply to the delay angle chamber 66 is cut off, and the hydraulic pressure of the advance angle chamber 65 is increased by supplying the oil into the advance angle chamber 65 while the hydraulic pressure in the delay angle chamber 66 is relieved.

On the other hand, when delaying the center phase of the exhaust valve 21, the oil supply to the advance angle chamber 65 is cut off, and the hydraulic pressure of the delay angle chamber 66 is increased by supplying the oil into the delay angle chamber 66 while the hydraulic pressure in the advance angle chamber 65 is relieved.

It should be noted that a structure of the intake side variable valve system 41 is obtained by configuring the structure of the exhaust side variable valve system 42 described above into an electric type driven by a motor.

That is, the same control as the exhaust side variable valve system 42 becomes possible by controlling a member with a structure corresponding to the rotor 64 in the exhaust side variable valve system 42 by the motor in the intake side variable valve system 41.

When performing a control according to the first embodiment during fuel cut, and the internal combustion engine 10 is stopped subsequently, it is difficult to start the internal combustion engine 10 if the center phases of the intake valve 20 and the exhaust valve 21 remain at the fuel cut.

This is because an intake air amount is reduced by the delay angle control of the intake valve 20, the exhaust is started at the expansion stroke by the advance angle control of the exhaust valve 21, and the exhaust gas of the second half of the exhaust stroke is confined within the cylinder.

Therefore, in the control unit 50 according to the present embodiment, the intake side variable valve system and the exhaust side variable valve system 42 are controlled so that the center phases of the intake valve 20 and the exhaust valve 21 are respectively configured to the starting phase when restarting the internal combustion engine 10.

The starting phase will be described with reference to FIGS. 10 and 11.

FIG. 10 shows the center phases of the intake valve 20 and exhaust valve 21 in each control state of the internal combustion engine 10.

Figure 11:
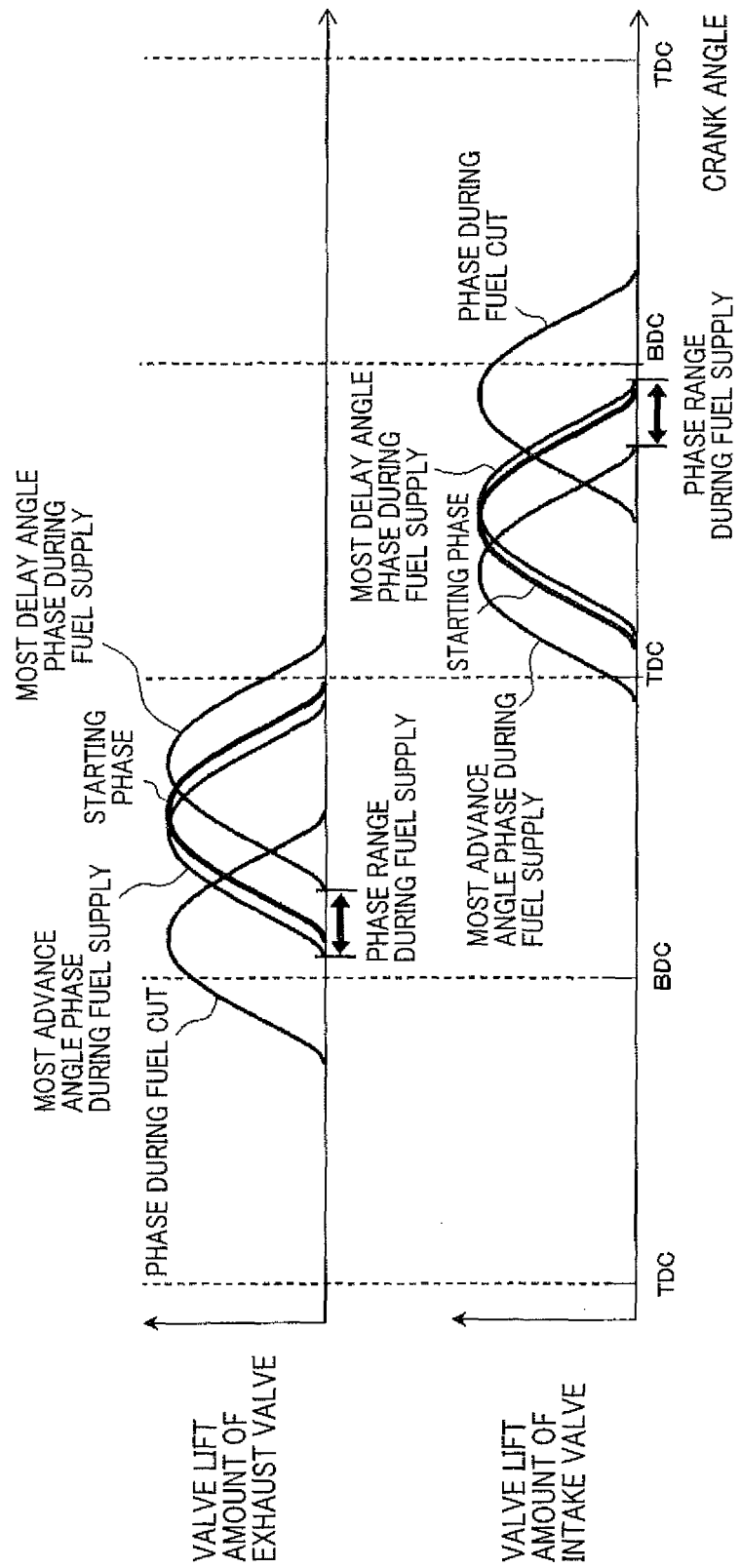
FIG. 11 shows diagrams showing relationships between valve lift amounts of the intake and exhaust valves and the phases in the second embodiment.

In addition, in FIG. 11, vertical axes show valve lift amounts of the intake valve 20 and the exhaust valve 21, and horizontal axes show crank angles.

It should be noted that in FIG. 11, when values of the valve lift amount of the intake valve 20 and the exhaust valve 21 in the vertical axes are zero, it means that the intake valve 20 and the exhaust valve 21 are closed.

The center phase during the fuel supply is configured to have a predetermined range in accordance with operating conditions of the vehicle such as the fuel supply amount.

Further, when starting the internal combustion engine 10, the starting phase is positioned within the range of the center phase during the fuel supply.

That is, each of the opening and closing timing of the intake valve 20 when starting the internal combustion engine 10 is within the respective range of the opening and closing timing of the intake valve 20 during the fuel supply, and each of the opening and closing timing of the exhaust valve 21 when starting the internal combustion engine 10 is within the respective range of the opening and closing timing of the exhaust valve 21 during the fuel supply.

In addition, as described above, the urging force of the urging member 70 is applied to the intake valve 20 and the exhaust valve 21 from the delay angle direction toward the starting phase.

It should be noted that since the starting phase is a phase in a central position of the control range during the fuel supply, the starting phase may be referred to as a center phase.

A series of processes that the control system 50 in the present embodiment executes will be described with reference to a flowchart of FIG. 12.

First, it is determined whether a stop request of the internal combustion engine 10 is made (S101).

In the process of step S101, the stop request is made in a case where the speed of the vehicle falls below a predetermined value or the like if the vehicle is equipped with an idling stop function.

Further, the stop request is made when a stop operation of the internal combustion engine 10 is made by the driver regardless of whether the idling stop function is provided.

If the stop request of the internal combustion engine is not made (S101: NO), the series of processes is ended.

If the stop request of the internal combustion engine 10 is made (S101: YES), it is determined whether or not the stop request is made during the operation during the fuel supply (S102).

If the stop request is made during the fuel supply (S102: YES), an advance or delay angle amount is calculated (S103) so as to advance or delay the center phase of the exhaust valve 21 to the starting phase based on a current operating condition.

On the other hand, if the stop request is not made during the operation during the fuel supply, i.e., when the stop request is made during the fuel cut (S102: NO), the delay angle amount is calculated (S104) so as to delay the center phase of the exhaust valve 21 to the starting phase.

Subsequently, the exhaust side variable valve system 42 is controlled so as to configure the center phase of the exhaust valve 21 to the starting phase and to configure the center phase of the opening and closing timings of the exhaust valve 21 (S105) by using the advance or delay angle amount calculated in S103, or the delay angle amount calculated in S104.

Then, it is determined whether the center phase reaches the starting phase (S106).

If the center phase is not reached to the starting phase (S106: NO), the control of S105 is repeated.

If the center phase of the opening and closing timings of the exhaust valve 21 reaches the starting phase (S106: YES), the internal combustion engine 10 is stopped (S107), and the series of processes is ended.

It should be noted that when the center phase of the opening and closing timings of the exhaust valve 21 reaches the starting phase, the lock pin 68 of the exhaust side variable valve system 42 engages into the lock hole 63, and suppresses the center phase of the exhaust valve 21 from displacing from the starting phase.

Then, a series of processes when starting the internal combustion engine 10 will be described with reference to a flowchart of FIG. 13.

First, it is determined whether a start request of the internal combustion engine 10 is made (S201).

In the process of S201, it is determined that the start request is made in a case where an accelerating operation by the driver is performed if the vehicle is equipped with the idling stop function.

Further, it is determined that the start request is made when a starting switch is turned on by the driver regardless of whether the idling stop function is equipped.

If the start request of the internal combustion engine 10 is not made (S201: NO), the series of processes is ended.

If the start request of the internal combustion engine 10 is made (S201: YES), a starting control of the internal combustion engine 10 it performed (S202).

Specifically, the crank shaft of the internal combustion engine 10 is rotated by a starting motor, and when the rotational speed of the crank shaft reaches to a predetermined speed, the fuel is injected into the cylinder from the injector 11b and the fuel therein is ignited by the spark plug 24.

Subsequently, it is determined whether the internal combustion engine 10 is in a complete combustion state (S203).

In the process of S203, it is determined whether or not the internal combustion engine 10 is in the complete combustion state depending on whether the rotational speed of the crank shaft of the internal combustion engine 10 reaches the predetermined speed.

If the internal combustion engine 10 is not in the complete combustion state (S203: NO), the starting control of the internal combustion engine 10 is continued (S202).

If the internal combustion engine 10 is in the complete combustion state (S203: YES), the locking by the lock pin 68 is released (S204), and the series of processes is ended.

Incidentally, upon performing the processes according to the flowchart of FIG. 13, the starting control of the internal combustion engine 10 may be started under a condition where it is determined whether the center phase of the exhaust valve 21 is in the starting phase by the urging member 70, and the center phase is in the starting phase.

Since the control of the intake valve 20 is controlled similarly with the exhaust valve 21 by reversing the advance and delay angles, a flow chart for the control thereof will be omitted.

Further, since the intake valve 20 adopts the electric type intake side variable valve system 41 as described above, the control of configuring the center phase to the starting phase may not be performed when the internal combustion engine 10 is stopped, but may be performed when starting the internal combustion engine 10.

With the above configuration, the control unit 50 of the internal combustion engine 10 according to the present embodiment has the following effects in addition to the effects of the control system 50 of the internal combustion engine 10 according to the first embodiment.

If the center phase of the intake valve 20 is at the phase during the fuel cut when starting the internal combustion engine 10, it becomes difficult to start the internal combustion engine 10 because the intake air amount is reduced.

In this regard, since the center phase of the intake valve 20 is configured to the starting phase by advancing the center phase further than at the phase during the fuel cut when the internal combustion engine 10 is stopped in the present embodiment, an intake of air can be performed at the starting phase when starting the internal combustion engine 10.

Therefore, it is possible to improve a starting performance of the internal combustion engine 10.

If the center phase of the exhaust valve 21 is at the phase during the fuel cut when starting the internal combustion engine 10, it becomes difficult to start the internal combustion engine 10 because a flow of the exhaust gets worse.

In this regard, since the center phase of the exhaust valve 21 is configured to the starting phase by delaying the center phase further than at the phase during the fuel cut when the internal combustion engine 10 is stopped in the present embodiment, a discharge of the exhaust can be performed at the starting phase when starting the internal combustion engine 10.

Therefore, it is possible to improve the starting performance of the internal combustion engine 10.

In the intake side variable valve system 41 and the exhaust side variable valve system 42, the urging member 70 for imparting the urging force from the most delayed angle side phase toward the starting phase is provided.

Thereby, since the center phase can be configured to the starting phase by the urging force even if an abnormality occurs in driving mechanisms of the intake side variable valve system 41 and the exhaust side variable valve system 42, starting the internal combustion engine 10 becomes possible.

When employing an electric type variable valve system, although responsiveness is improved as compared with that of a hydraulic type, the cost is reduced.

In this regard, since the electric type is employed for the intake side variable valve system 41 and the hydraulic type is employed for the exhaust side variable valve system 42 in the present embodiment, while suppressing the cost from increasing, it is possible to ensure the responsiveness.

Third Embodiment

Each of the above embodiments relates to the control when the intake valve 20 and exhaust valve 21 are operating properly.

At this time, when an abnormality such as sticking occurs to either one of the valves in a condition where the center phases of the intake valve 20 and the exhaust valve 21 are configured to be the phases used during the fuel cut, and it becomes impossible to change the center phase from the phase during the fuel cut, there are cases where the operation of the internal combustion engine 10 is hindered, or restarting of the internal combustion engine 10 becomes difficult.

This is because the intake air amount is reduced when the intake valve 20 is in the phase during the fuel cut, and the exhaust gas is confined when the exhaust valve 21 is in the phase during the fuel cut.

Therefore, evacuation travel may be performed by changing the center phase of the exhaust valve 21 when the abnormality occurs in the intake valve 20, and by changing the center phase of the intake valve 20 when the abnormality occurs in the exhaust valve 21.

The center phase will be described with reference to FIG. 14.

If the abnormality occurs in the intake valve 20, the center phase of the exhaust valve 21 is delayed further than at the most delay angle phase during the fuel supply, and the flow of the exhaust improves.

By doing so, it is possible to increase the intake air amount, and it is possible to bring an air-fuel ratio in the combustion chamber 19 to an appropriate value.

Therefore, ignition of a mixture in the combustion chamber 19 becomes easy.

On the other hand, if the abnormality occurs in the exhaust valve 21, the center phase of the intake valve 20 is advanced further than at the most advance angle phase during the fuel supply, and the intake air amount increases.

By doing so, the pressure of the mixture in the combustion chamber 19 rises, and the temperature of the mixture also rises accordingly.

Therefore, it becomes easy to ignite the mixture.

A series of processes that the control system 50 in the present embodiment executes will be described with reference to a flowchart of FIG. 15.

The processes in the flowchart of FIG. 15 are performed after the delay angle control of the intake valve 20 and the advance angle control of the exhaust valve 21 during the fuel cut are finished, for example.

First, it is determined whether or not a phase difference between the center phase and the target phase of the intake valve 20 continues exceeding a predetermined value for a predetermined time period (S301).

This predetermined time period of is set based on a transition time of the center phase of the intake valve 20 from the phase during the fuel cut to the phase during the fuel supply, or is set based on a transition time to the starting phase.

That is, if the phase difference is continued for a predetermined time period, it shows a state where the center phase of the intake valve 20 is not changed even if a control for changing the center phase of the intake valve 20 is performed, and it means that the abnormality of sticking or the like occurs in the intake valve 20.

Therefore, if the phase difference continues exceeding the predetermined value for the predetermined time period (S301: YES), an abnormality flag of the intake valve 20 is set to ON (S302), and a target phase of the exhaust valve 21 is calculated (S303).

Subsequently, the exhaust side variable valve system 42 is controlled (S304), and it is determined whether the center phase of the exhaust valve 21 becomes the target phase (S305).

If the center phase of the exhaust valve 21 does not become the target phase (S305: NO), the process of S304 is continued.

If the center phase of the exhaust valve 21 becomes the target phase (S305: YES), the series of processes is ended.

On the other hand, if the phase difference between the center phase and the target phase of the intake valve 20 does not continue exceeding the predetermined value for the predetermined time period (S301: NO), it means that the intake valve 20 is in transition to the target phase, or it becomes the target phase.

Therefore, the abnormality flag of the intake valve is set to OFF (S306), and it is determined whether or not a phase difference between the center phase and the target phase of the exhaust valve 21 continues exceeding a predetermined value for a predetermined time period (S307).

If the phase difference continues exceeding the predetermined value for the predetermined period (S307: YES), an abnormality flag of the exhaust valve 21 is set to ON (S308), and a target phase of the intake valve 20 is calculated (S309).

Subsequently, the intake side variable valve system 41 is controlled (S310), and it is determined whether the center phase of the intake valve 20 becomes the target phase (S311).

If the center phase of the intake valve 20 does not become the target phase (S311: NO), the process of S310 is continued.

If the center phase of the intake valve 20 becomes the target phase (S311: YES), the series of processes is ended.

Incidentally, if the phase difference between the center phase and the target phase of the exhaust valve 21 does not continue exceeding the predetermined value for the predetermined time period (S307: NO), the abnormality flag of the exhaust valve 21 is set to OFF (S312), and the series of processes is ended.

Further, since the phase difference becomes equal to or less than the predetermined value when the intake valve 20 has recovered from the abnormality, a negative determination is made in the process of S301 (S301: NO).

In such a case, the abnormality flag of the intake valve 20 is set to OFF (S306), and the process transfers to the normal control described in the first and the second embodiments.

Similarly, when the exhaust valve 21 has recovered from the abnormality, a negative determination is made in the process of S307 (S307: NO).

In such a case, the abnormality flag of the exhaust valve 21 is set to OFF (S312), and the process transfers to the normal control described in the first and the second embodiments.

Meanwhile, in performing the evacuation travel mentioned above, how to set the center phase of the intake valve 20 or exhaust valve 21 is determined depending on a travelling under what condition is enabled.

That is, in FIG. 14, when performing evacuation travel, the intake valve 20 is set to the most advanced angle side of the operating range, and the exhaust valves 21 are set to the most delayed angle side of the operating range.

However, depending on the conditions of the evacuation travel, such a setting may not be necessary, and the intake valve 20 may be set to any advanced angle side of the control range during the fuel supply, while the exhaust valve 21 may be set to any delayed angle side of the control range during the fuel supply.

Specifically, it is possible to determine the center phase of the intake valve 20 or the exhaust valve 21 during the evacuation travel in the following standard.

(A) To enable a hill start or to allow an acceleration even during hill-climbing.

In this case, it is possible to continue the evacuation travel even if an abnormality occurs in either one of the intake valve 20 and exhaust valve 21 that changes the phase for performing the evacuation travel.

(B) The center phase is determined based on the current running condition of the vehicle.

In this case, it is possible to improve a degree of freedom in controlling a side where the abnormality is not occurring.

(C) The center phase is determined using a history of a traveling condition of the vehicle.

In this case, while securing the degree of freedom in controlling the side where the abnormality is not occurring, it is possible to continue the evacuation travel even if an abnormality occurs in either one of the intake valve 20 and exhaust valve 21 that changes the phase for performing the evacuation travel.

With the above configuration, the control unit 50 of the internal combustion engine 10 according to the present embodiment has the following effects.

In a case when the abnormality occurs in the intake valve 20, the center phase of the exhaust valve 21 is delayed further than at the most delay angle phase during the fuel supply.

Thereby, it is possible to improve the flow of the exhaust, and it is possible to increase the intake air amount in accordance with it.

That is, it is possible to bring the air-fuel ratio in the combustion chamber 19 to the appropriate value.

Therefore, the ignition of the mixture in the combustion chamber 19 becomes easy, and it is possible to allow the evacuation travel of the vehicle.

In a case when the abnormality occurs in the exhaust valve 21, the center phase of the intake valve 20 is advanced further than at the most advance angle phase during the fuel supply.

Thereby, it is possible to increase the intake air amount, thus the pressure of the mixture in the combustion chamber 19 rises, and the temperature of the mixture also rises accordingly.

Therefore, it becomes easy to ignite the mixture.

<Modification>

In the embodiments described above, it is assumed that the delay angle control of the intake valve 20 and the advance angle control of the exhaust valve 21 are performed under a condition that the throttle opening is set to fully opened.

However, the delay angle control of the intake valve 20 and the advance angle control of the exhaust valve 21 may be performed under a condition that the throttle opening is reduced.

When the throttle opening is increased, a problem occurs that intake noise increases.

Therefore, it is possible to suppress the intake noise from increasing by reducing the throttle opening.

Since the blow-back of the intake air occurs due to the delay angle control of the opening timing of the intake valve 20, the difference is smaller between the amount of the intake air when the throttle opening is large and when it is small.

Note that it is possible to increase the effect of reducing the pumping loss by increasing the throttle opening.

In the embodiments mentioned above, although specific values of the advance angle and the delay angle are indicated, these values not necessarily indicate the optimum value, and also that the above-mentioned effects are accomplished not from only the specific values.

Specific values of the advance angle and the delay angle can be appropriately modified depending on the structures of the internal combustion engine 10, the intake pipe 11, the exhaust pipe 12, and the like.

In the above embodiments, although the internal combustion engine 10 is a gasoline engine, a diesel engine with a compression ignition system may be an internal combustion engine 10.

In the above embodiments, it is possible to reduce the exhaust gas flow rate during the fuel cut even when the throttle opening is fully opened.

Therefore, even in the diesel engine without a throttle, it is possible to reduce the exhaust gas flow rate during the fuel cut by applying the above-mentioned embodiment, and thereby it is possible to suppress the temperature of the exhaust catalyst from dropping.

In the above embodiments, a delay angle amount of the opening timing and a delay angle amount of the closing timing of the intake valve 20 are set to the same angle, and an advance angle amount of the opening timing and an advance angle amount of the closing timing of the exhaust valve 21 are set to the same angle by the center phase changing mechanism.

However, a variable valve system that is also capable of varying a delay angle amount of the opening timing and a delay angle amount of the closing timing of the intake valve 20 may be employed, and a variable valve system that is also capable of varying an advance angle amount of the opening timing and an advance angle amount of the closing timing of the exhaust valve 21 may also be employed.

That is, although a complexity of the structure of the variable valve system occurs, it is possible to control the delay angle amount of the opening timing and the delay angle amount of the closing timing of the intake valve 20 independently, and it is also possible to control the advance angle amount of the opening timing and the advance angle amount of the closing timing of the exhaust valve 21 independently.

In the above embodiments, regarding the valve timing during the fuel supply, although the opening control of the intake valve 20 and the closing control of the exhaust valve 21 are assumed to be performed at T0 (=T6), the opening timing of the intake valve 20 and the closing timing of the exhaust valve 21 may be overlapped by advancing the opening timing of the intake valve 20 and delaying the opening timing of the exhaust valve 21.

Although the electric type is employed for the intake side variable valve system 41 and the hydraulic type is employed for the exhaust side variable valve system 42 in the second embodiment, both may employ the electric type, or both may employ the hydraulic type.

Although the starting phase is configured within the range during the fuel supply in the second embodiment, if it is possible to start the internal combustion engine 10 even the starting phase fall outside the range during the fuel supply, the starting phase may be configured out of the range during the fuel supply.

In this case, the center phase of the exhaust valve 21 may be set to a further delayed angle side more than at the center phase during the fuel cut and may be set to a further advanced angle side more than at the most advanced side of the center phase during the fuel supply, and the center phase of the intake valve 20 may be set to a further advanced angle side more than at the center phase during the fuel cut and may be set to a further delayed angle side more than at the most advanced side of the center phase during the fuel supply.

In the above embodiments, although it is assumed to mount a control system for an internal combustion engine 10 in a vehicle, the mounting target is not limited to a vehicle.

In other words, the mounting target may be a vessel that utilizes regenerative power during the fuel cut.

Further, the mounting target may be one that does not utilize the regenerative power during the fuel cut.

What is claimed is:

1. A control system for an internal combustion engine comprising:
    an intake valve, an exhaust valve, and an exhaust purifying catalyst that purifies exhaust gas after combustion of a fuel; wherein,
    during a fuel cut in which no fuel is supplied, a closing timing of the intake valve is controlled to a delayed angle side more than at a timing when the fuel is supplied and to a delayed angle side more than at a timing at a bottom dead center of an intake stroke; and
    an opening timing of the exhaust valve is controlled to an advanced angle side more than at the timing when the fuel is supplied and to an advanced angle side more than at the timing at the bottom dead center of an expansion stroke.

2. The control system according to claim 1, wherein,
    the opening timing of the exhaust valve is controlled to the advanced angle side more than at the timing when the fuel is supplied and to the advanced angle side more than at the timing at the bottom dead center of the expansion stroke;
    the closing timing of the exhaust valve is controlled to the advanced angle side more than at the timing when the fuel is supplied and to the advanced angle side more than at the timing at the top dead center of the exhaust stroke;
    the opening timing of the intake valve is controlled to the delayed angle side more than at the timing when the fuel is supplied and to the delayed angle side more than at the timing at the top dead center of the exhaust stroke; and
    the closing timing of the intake valve is controlled to the delayed angle side more than at the timing when the fuel is supplied and to the delayed angle side more than at the timing at the bottom dead center of the intake stroke.

3. The control system according to claim 2, wherein,
    when the opening and closing timings of the intake valve become unchangeable from the opening and closing timings during the fuel cut, each of the opening and closing timings of the exhaust valve is set to the delayed angle side further than at the opening and closing timings during the fuel supply.

4. The control system according to claim 2, wherein,
    when the opening and closing timings of the exhaust valve become unchangeable from the opening and closing timings during the fuel cut, each of the opening and closing timings of the intake valve is set to the advanced angle side further than at the opening and closing timings during the fuel supply.

5. The control system according to claim 2, wherein,
    center phases of the opening and closing timings of the exhaust valve are controlled to the advanced angle side; and
    center phases of the opening and closing timings of the intake valve are controlled to the delayed angle side.

6. The control system according to claim 2, wherein,
    the opening and closing timings of the exhaust valve during the fuel supply are configured to have predetermined ranges;
    when a predetermined condition is satisfied, each of the opening and closing timing of the exhaust valve is configured to be a center phase; and
    the center phases are set to a further delayed angle side more than at the opening and closing timings during the fuel cut, and are set to a further advanced angle side more than at the most delayed side timing of the opening and closing timings during the fuel supply.

7. The control system according to claim 6, wherein,
    if the opening and closing timings of the exhaust valve are determined to be the center phases when starting the internal combustion engine, the fuel supply to the internal combustion engine is started.

8. The control system according to claim 6, wherein,
    the center phase is within the range of the opening and closing timings during the fuel supply.

9. The control system according to claim 6, wherein,
    the predetermined condition is at least either one of the internal combustion engine being stopped or the internal combustion engine being started.

10. The control system according to claim 6, wherein,
    the opening and closing timings of the intake valve are changed by controlling an intake side variable valve system and the opening and closing timings of the exhaust valve are controlling by an exhaust side variable valve system; and
    an urging member that applies an urging force to the valve from a direction in the most delayed angle side during the fuel supply toward a direction of the center phase is disposed in at least one of the intake side variable valve system and the exhaust side variable valve system.

11. The control system according to claim 10, wherein,
    the intake side variable valve system is an electric type, and the exhaust side variable valve system is a hydraulic type.

12. The control system according to claim 2, wherein,
    the opening and closing timings of the intake valve during the fuel supply are configured to have predetermined ranges;
    when a predetermined condition is satisfied, each of the opening and closing timing of the intake valve is configured to be a center phase; and
    the center phase is set to a further advanced angle side more than at the opening and closing timings during the fuel cut, and is set to a further delayed angle side more than at the most advanced side timing of the opening and closing timings during the fuel supply.

13. The control system according to claim 12, wherein,
    if the opening and closing timings of the intake valve are determined to be the center phases when starting the internal combustion engine, the fuel supply to the internal combustion engine is started.

* * * * *